Patented June 24, 1930

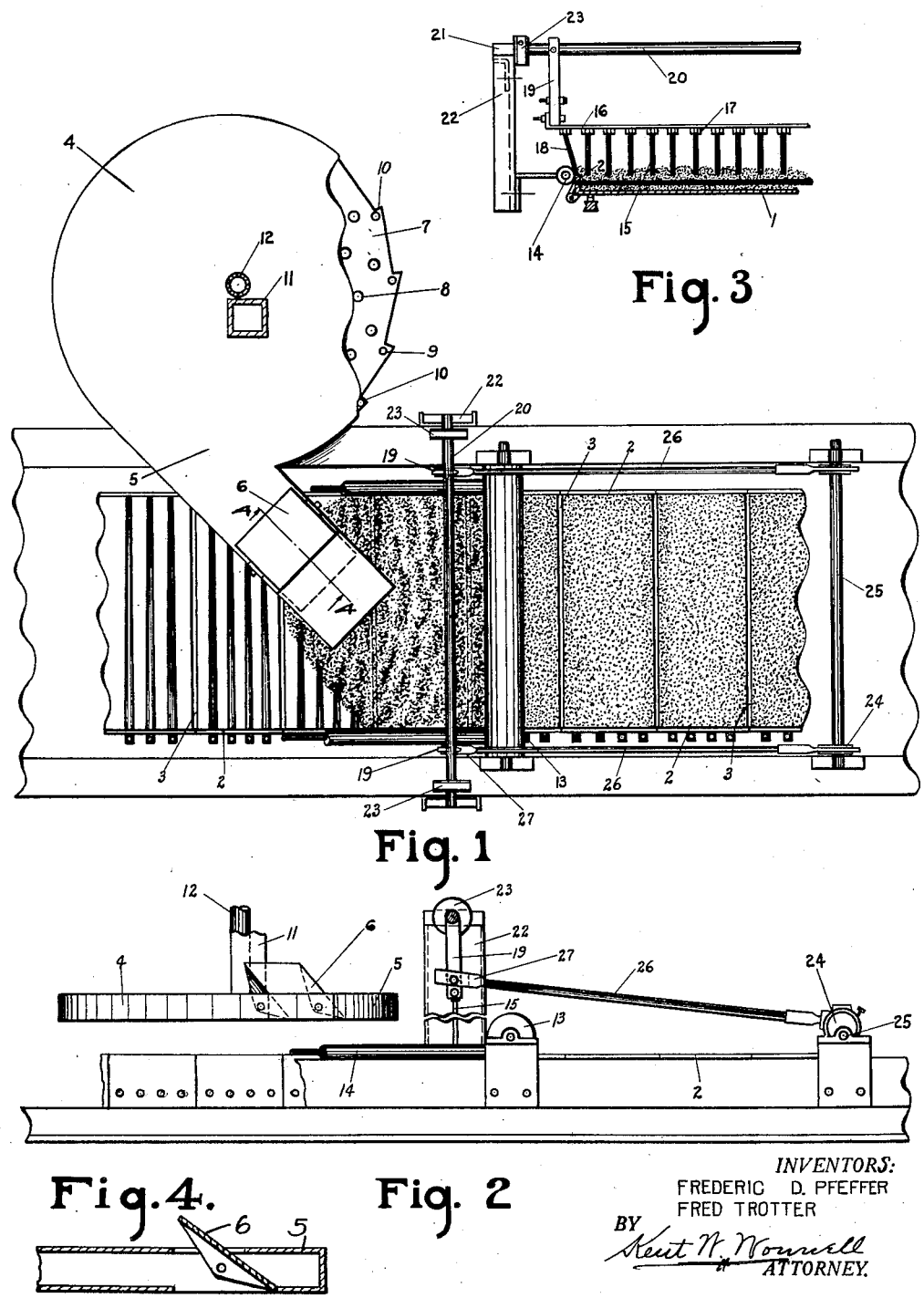

1,768,141

UNITED STATES PATENT OFFICE

FREDERIC D. PFEFFER AND FRED TROTTER, OF FORT DODGE, IOWA, ASSIGNORS TO UNITED STATES GYPSUM COMPANY, OF CHICAGO, ILLINOIS, A CORPORATION OF ILLINOIS

APPARATUS FOR MAKING BLOCKS

Application filed April 5, 1926. Serial No. 99,816.

This invention relates to a block making machine of continuous type, the blocks setting sufficiently during the progress of the machine so that they can be removed from the machine and the molds used continuously. Among the objects of the invention are; to provide a continuous supply of plastic material, such as calcined gypsum, which sets or hardens during the operation of the machine; to thoroughly agitate the plastic material as it is applied to the molds, to liberate air bubbles for entrapped air therefrom; to suitably confine and apply the plastic material to the molds; and in general to produce a suitable mechanism for carrying out the method herein shown and described.

In the accompanying drawing Fig. 1 is a plan view partly in section of a block machine constructed in accordance with the principles of this invention; Fig. 2 is a side elevation of the machine with parts shown in section; Fig. 3 is an elevation showing the construction of the agitating device, and Fig. 4 is a sectional view through the deflector on the line 4—4 of Fig. 1.

In carrying out the method of this invention a continuous wet mixer is mounted to discharge plastic material into the forms or molds which move continuously under a roller or former for gauging the thickness of the blocks, in advance of which is an agitator having a number of rods or prongs adapted to stir and mix the plastic material in front of the roller to liberate any entrapped air which would tend to form air bubbles in the finished product. The block molds or forms are moved continuously by the machine and when the plastic material is sufficiently set, the formed block or tile is discharged and the mold or form is carried about by the machine and reused in the same manner.

Referring more particularly to the drawings, a portion only of a continuously operating block machine is illustrated in Figs. 1 and 2 and comprises a number of continuously moving forms each comprising a bottom 1, end plates 2 pivoted to the bottom, and intermediate partitions 3. As the details of the block machine constitute no part of the present invention only those features are shown and described in detail which relate to the present invention.

At one side of the block machine is a continuous wet mixer 4 comprising a housing having a discharge spout 5 with an opening in the bottom to discharge directly into the open molds of the block machine. To control the opening in the spout 5 is a deflector 6 which diverts the plastic material from this spout and directs it toward the open molds. This wet mixer comprises a disc 7 adapted to be rotated at a high speed and mounted in the housing having a plurality of parts or projections 8 and 9 on the upper face of the disc and with teeth 10 in the periphery of the disc by means of which the mixed material is carried around in the housing and discharged under centrifugal action from the spout 5. The teeth 10 also serve to scrape out the housing and prevent the setting of gypsum therein. A measured quantity of dry and wet materials are discharged at or adjacent the center of the disc by means of a dry feeder pipe 11 and a liquid tube 12. By properly proportioning the amount of the dry and liquid materials any desired mixture of plastic mass can be obtained, the ingredients being intimately mixed by the rotation of the disc 7 at a high speed which causes the materials to be broken up, mixed, and intermingled by their engagement with the projections 8 and 9 as the mixed materials pass under centrifugal action from the center to the periphery of the disc 7 and by the carrying of the mixed materials to the discharge outlet in the spout 5.

The plastic mass which is discharged from the continuous mixer tends to pile up on the open forms in advance of a pressure roller 13 so that side rollers 14 are provided to properly confine the plastic mass at the ends of the forms.

In advance of the pressure or forming roller 13 is an agitator comprising a plurality of rods 15 threaded into and depending from a cross bar 16 and held in proper place therein by lock nuts 17. The end rods 15 are bent inwardly to clear the rollers 14, as shown more clearly in Fig. 3. This cross bar 16 is supported at its ends by arms 19 which are journaled on a cross shaft 20 rotatable in the bearings 21 at the top of the side standards 22. A positioning collar 23 may be applied at each end of the shaft to hold it in proper position with respect to the standards 22.

In order to agitate and move the rods 15 a pair of eccentrics 24 are secured adjacent the ends of a transverse shaft 25 and they are each connected by means of a link 26 with a corresponding arm 19 of the agitator device, by means of a yoke 27 at the end of each link 26. It is obvious that the rotation of the shaft 25 will cause a corresponding movement of the eccentrics 24 which will effect a swinging movement of the agitator rocking the fingers 15 back and forth over the top of the block molds as they pass continuously thereunder.

With this construction it is obvious that the operation of the machine is continuous and practically automatic; the speed of the wet mixer can be varied to discharge a specific amount which is just enough to fill the forms for the blocks as they move under the discharge of the wet mixer; the movement of the agitator back and forth not only liberates any air which might be entrapped, but it also serves to distribute the plastic material more uniformly over the molds; the rotation of the side rollers 14 prevents overflowing of the plastic material from the ends of the individual molds; and the forming roller 13 presses the plastic material into the mold and insures that the blocks will be of uniform thickness when they are set and dried.

We claim:

1. A continuous block forming machine in which a plastic mass is delivered continuously to a series of open moulds, means to gauge the thickness of the plastic mass which is applied to the moulds, and an agitator in advance of the gauging means having a plurality of fingers to stir up the plastic mass, and means to reciprocate the agitator.

2. A continuous block moulding machine comprising movable moulds, a pressure roller, a continuous plastic mass feeder, rotating guide at the ends of moulds and in advance of the pressure roller, and reciprocating agitators in front of the pressure roller and between the side rollers.

3. In a continuous block moulding machine, movable moulds, a continuous plastic mass feeder for the moulds, a pair of side rollers at the ends of the moulds to retain the plastic mass there between, and a toothed agitator movable at the top of the moulds, the side teeth being bent to clear the said rollers.

4. In a continuous block moulding machine comprising movable forms and a continuous plastic mass discharge, an agitator comprising a cross bar with adjustable depending teeth mounted to swing above the block forms, and means for reciprocating the cross bar in the direction of movement of the forms.

5. A continuous block forming machine which comprises movable open top forms and means for discharging continuously a plastic mass into the forms, gauging means to limit the thickness of plastic material applied to the forms, movable means extending above the upper edges of the forms at the ends thereof for confining the plastic mass there between, and an agitator having the fingers which reciprocate in the direction of movement of the forms for engaging the plastic mass in advance of the gauging means to agitate and assist in leveling the plastic mass before it reaches the gauging means.

FREDERIC D. PFEFFER.
FRED TROTTER.